(12) United States Patent
Silyaev et al.

(10) Patent No.: US 10,419,821 B2
(45) Date of Patent: *Sep. 17, 2019

(54) METHOD AND SYSTEM FOR PROVIDING COMPLETE INTERNET ANYWHERE WITH FULL SERVER ASSISTED PROCESSING (71) Applicant: Avago Technologies International Sales Pte. Limited, Singapore (SG)

(72) Inventors: Vladimir Silyaev, Laguna Niguel, CA (US); Marcus Kellerman, San Diego, CA (US); Xuemin Chen, Rancho Santa Fe, CA (US); David Erickson, San Clemente, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,656

(22) Filed: Aug. 10, 2015

(65) Prior Publication Data
US 2015/0350734 A1 Dec. 3, 2015

Related U.S. Application Data

(63) Continuation of application No. 12/650,141, filed on Dec. 30, 2009, now Pat. No. 9,106,437.
(Continued)

(51) Int. Cl.
*G06F 15/167* (2006.01)
*H04N 21/4782* (2011.01)
(Continued)

(52) U.S. Cl.
CPC ..... *H04N 21/4782* (2013.01); *H04L 12/2836* (2013.01); *H04L 67/02* (2013.01);
(Continued)

(58) Field of Classification Search
CPC . H04L 29/06; H04L 29/08056; G06F 3/0481; G06F 3/04812
See application file for complete search history.

(56) References Cited

U.S. PATENT DOCUMENTS 7,143,141 B1 * 11/2006 Morgan ................. H04L 29/06
709/217
7,143,428 B1 * 11/2006 Bruck ................. H04N 5/44543
725/37

(Continued)

OTHER PUBLICATIONS

Non-Final Office Action for U.S. Appl. No. 12/650,141 dated Dec. 23, 2010.
(Continued)

*Primary Examiner* — Dhairya A Patel
(74) *Attorney, Agent, or Firm* — Foley & Lardner LLP (57) ABSTRACT

A STB, communicatively coupled to a server, receives a web page request when, for example, a URI, is entered into a web browser running in the STB. In response, the STB sends a processing assistance request to the server for processing the entire web page regardless of processing capability of the STB. The STB receives processed information resources or contents associated with the entire web page from the server. The server retrieves information resources or contents associated with the entire web page from a web server based on the received processing assistance request. The server determines content type such as video and/or graphics of the retrieved information resources or contents for corresponding content processing. The server determines content formats supported by the STB for content encoding. The STB decodes the resulting encoded information resources or contents from the server to render the entire web page in the STB.

15 Claims, 5 Drawing Sheets

Related U.S. Application Data (60) Provisional application No. 61/261,780, filed on Nov. 17, 2009.

(51) Int. Cl.
 *H04N 21/222* (2011.01)
 *H04N 21/462* (2011.01)
 *H04N 21/437* (2011.01)
 *H04N 21/239* (2011.01)
 *H04N 21/643* (2011.01)
 *H04L 12/28* (2006.01)
 *H04L 29/08* (2006.01)
 *H04N 21/20* (2011.01)

(52) U.S. Cl.
 CPC ....... *H04N 21/222* (2013.01); *H04N 21/2393* (2013.01); *H04N 21/437* (2013.01); *H04N 21/4622* (2013.01); *H04N 21/64322* (2013.01); *H04N 21/20* (2013.01); *H04N 21/2221* (2013.01)

(56) References Cited

U.S. PATENT DOCUMENTS

| | | | | |
|---|---|---|---|---|
| 7,640,512 B1* | 12/2009 | Appling | ............ | G06F 16/9577 715/771 |
| 7,770,103 B2* | 8/2010 | Hammerich | ......... | G06F 17/243 707/999.103 |
| 8,448,214 B2* | 5/2013 | Kellerman | ......... | H04N 7/17318 725/110 |
| 2002/0095687 A1* | 7/2002 | Shintani | ............. | H04N 7/17318 725/112 |
| 2004/0031052 A1* | 2/2004 | Wannamaker | ......... | A63F 13/12 725/61 |
| 2005/0216940 A1* | 9/2005 | Black | .................... | H04N 7/163 725/87 |
| 2006/0117340 A1* | 6/2006 | Pavlovskaia | ........... | H04N 7/163 725/34 |
| 2008/0092176 A1* | 4/2008 | Raftelis | ............... | H04N 7/17318 725/61 |
| 2008/0098450 A1* | 4/2008 | Wu | .................... | H04N 21/4312 725/132 |
| 2008/0141320 A1* | 6/2008 | McCarthy | .......... | H04N 7/17318 725/110 |
| 2008/0162495 A1* | 7/2008 | Chu | .................... | H04N 7/17318 |
| 2008/0195691 A1* | 8/2008 | Kloba | ............... | H04M 1/72561 709/201 |
| 2009/0044125 A1* | 2/2009 | Tsun | ....................... | G06F 9/451 715/733 |
| 2009/0089811 A1* | 4/2009 | Ferlitsch | ............... | G06F 3/1205 719/321 |
| 2009/0193490 A1* | 7/2009 | Stone | ..................... | G09G 5/003 725/151 |
| 2009/0240586 A1* | 9/2009 | Ramer | ................... | G06Q 20/10 705/14.64 |
| 2010/0058417 A1* | 3/2010 | Rondeau | .............. | H04N 5/4403 725/110 |
| 2010/0145938 A1* | 6/2010 | Boetje | .................. | G06F 16/245 707/736 |
| 2010/0306162 A1* | 12/2010 | Madani | ................... | H04W 4/02 706/52 |
| 2011/0099574 A1* | 4/2011 | Haeuser | ........... | H04N 21/43615 725/30 |

OTHER PUBLICATIONS

Final Office Action for U.S. Appl. No. 12/650,141 dated Jun. 10, 2011.
Non-Final Office Action for U.S. Appl. No. 12/650,141 dated Jan. 13, 2012.
Final Office Action for U.S. Appl. No. 12/650,141 dated Aug. 17, 2012.
Non-Final Office Action for U.S. Appl. No. 12/650,141 dated Nov. 22, 2013.
Final Office Action for U.S. Appl. No. 12/650,141 dated Aug. 13, 2014.
Notice of Allowance for U.S. Appl. No. 12/650,141 dated Apr. 8, 2015.

* cited by examiner

METHOD AND SYSTEM FOR PROVIDING COMPLETE INTERNET ANYWHERE WITH FULL SERVER ASSISTED PROCESSING

CROSS-REFERENCE TO RELATED APPLICATIONS/INCORPORATION BY REFERENCE

This patent application is a continuation of and claims priority to and the benefit of U.S. patent application Ser. No. 12/650,141, filed Dec. 30, 2009, which claims priority to and the benefit of U.S. Provisional Patent Application Ser. No. 61/261,780 filed Nov. 17, 2009. This application also makes reference to:

U.S. patent application Ser. No. 12/650,145 filed on Dec. 30, 2009;
U.S. patent application Ser. No. 12/650,140 filed on Dec. 30, 2009;
U.S. patent application Ser. No. 12/649,971 filed on Dec. 30, 2009;
U.S. patent application Ser. No. 12/650,069 filed on Dec. 30, 2009
U.S. patent application Ser. No. 12/650,067 filed on Dec. 30, 2009;
U.S. patent application Ser. No. 12/650,020 filed on Dec. 30, 2009;
U.S. patent application Ser. No. 12/650,171 filed on Dec. 30, 2009; and
U.S. patent application Ser. No. 12/649,998 filed on Dec. 30, 2009

Each of the above stated applications is hereby incorporated herein by reference in its entirety for all purposes.

FIELD OF THE INVENTION

Certain embodiments of the invention relate to communication systems. More specifically, certain embodiments of the invention relate to a method and system for providing complete Internet anywhere with full server assisted processing.

BACKGROUND OF THE INVENTION

With the continuous growth of on-line businesses, social networks, and other on-line services and applications, a user may want a larger number of places or locations from which to access the Internet in a manner that is flexible and/or suits the user's lifestyle. Most users currently connect to the Internet using a web browser running on a personal computer. While only a portion of homes have a computer, most homes have a television, and in many instances, multiple televisions. Therefore, rather than using a computer to access the Internet, a user may find it more convenient to use the flat screen televisions and/or monitors in homes for the same purpose. To do so, a set-top-box (STB) connected to, for example, a flat screen television may be provided with web browsing software and protocols, and Internet connectivity, which may enable the user to easily access the Internet or check their electronic mail (email), for example, from a convenient and comfortable location such as their living room.

There may be instances, however, in which the STB may not be configured to support and/or capable of processing certain contents in a web page. Moreover, there may be instances in which the latency associated with rendering or displaying certain contents in a web page may be long because of the processing capabilities of the STB. This may affect the overall experience of the user.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for providing complete Internet anywhere with full server assisted processing, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for providing complete Internet anywhere with full server assisted processing. In various embodiments of the invention, a STB, communicatively coupled to a server, is operable to receive a web page request when a user inputs, for example, a URI, into a web browser running in the STB. In response, the STB is operable to send a web page processing assistance request to the server for processing the entire web page indicated in the web page processing assistance request regardless of processing capability of the STB. The STB is operable to receive processed information resources or contents associated with each portion of the entire web page from the server. The server may communicate with a web server to retrieve corresponding information resources or contents associated with each portion of the entire web page based on the web page processing assistance request received from the STB. The content type comprising, for example, video, audio, bitmap, text, and/or graphics, of the corresponding retrieved information resources or contents associated with each portion of the entire web page may be determined by the server. The server may be operable to process the retrieved information resource or contents for each portion of the entire web page based on the corresponding determined content type. Content formats supported by the STB may be determined for each portion of the entire web page. The corresponding processed information resources or contents associated with each portion of the entire web page may be encoded by the server based on the determined content formats. The encoded information resources or contents may be transmitted to the STB by the server. The STB may be operable to decode the encoded information resources or contents associated with each portion of the entire web page received from the server so as to composite or render the entire web page to be rendered via the web browser in the STB.

Figure 1:
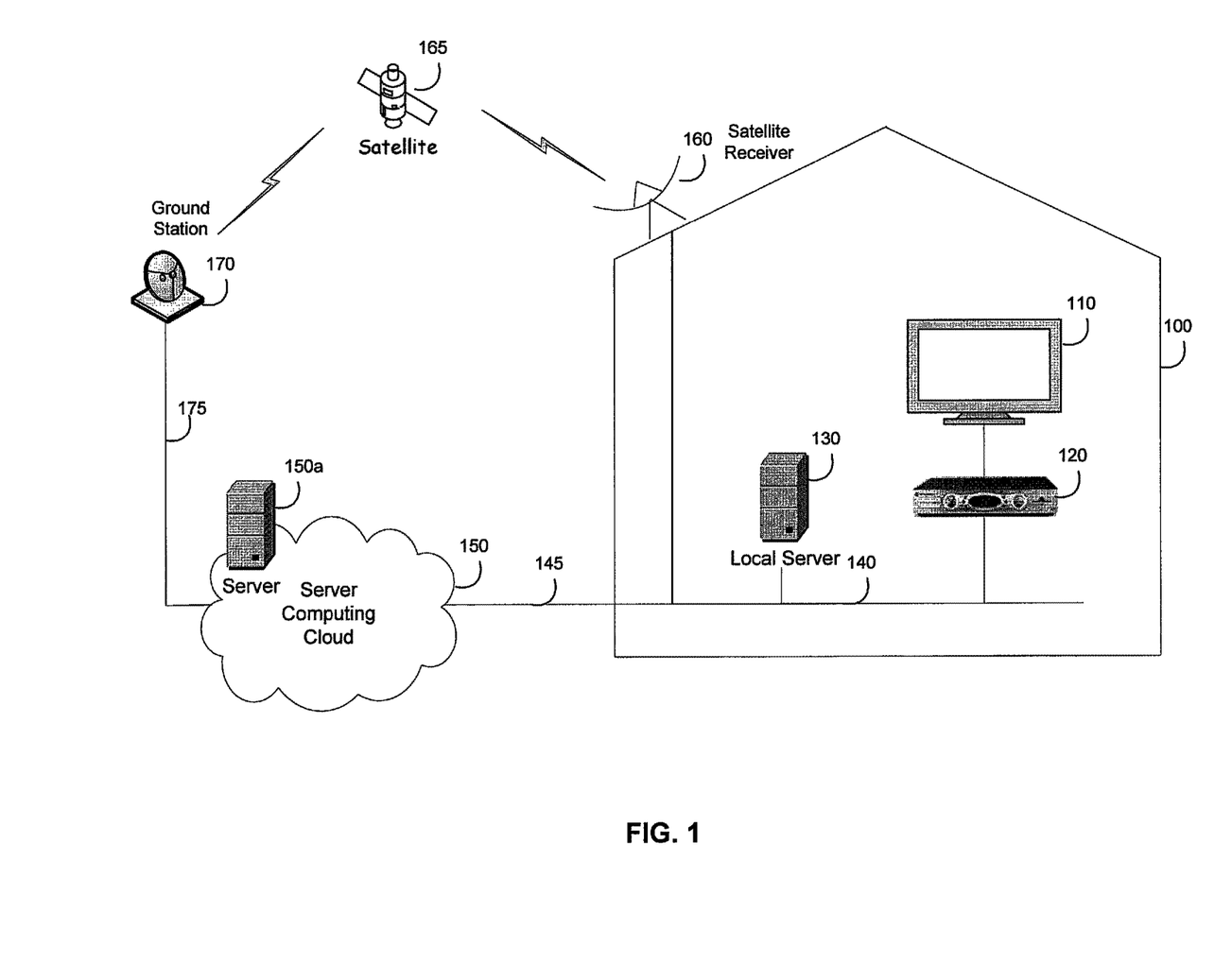
FIG. 1 is a diagram that illustrates an exemplary home or office configured to access Internet services via a set-top-box (STB) with full server assisted processing, in accordance with an embodiment of the invention.

FIG. 1 is a diagram that illustrates an exemplary home or office configured to access Internet services via a set-top-box (STB) with full server assisted processing, in accordance with an embodiment of the invention. Referring to FIG. 1, there is shown a location 100 within which may be disposed a television 110, an STB 120, a local server 130, a broadband connection 140, a computing cloud 150 coupled to the location 100 via a broadband connection 145. Also shown in FIG. 1 are a ground station 170 communicatively coupled to the server computing cloud 150 via a broadband connection 175, a satellite 165, and a satellite receiver 160 coupled to the location 100. The satellite receiver 160 may be operable to communicate with the STB 120 via the broadband connection 140 in the location 100.

The location 100 may be a home, a business, a school, a library, and/or other like setting in which a user may want to access the Internet and/or check their electronic mail (email). The position or placement of the television set 110, the STB 120, and/or the local server 130 within the location 100 may be based on user convenience and/or lifestyle. For example, when location 100 is a home (for example, a house and/or an apartment), the television 110 and the STB 120 may be located in a bedroom, a family room, or an entertainment room. In another example, when location 100 is a business or a public building, the television 110 and the STB 120 may be located in a conference room. The local server 130 may be located nearby (for example, in the same room) the television set 110 and the STB 120 or may be located remotely (for example, in another room or nearby building) from the television set 110 and the STB 120. Devices within the location 100 may be connected via a wired connection and/or a wireless connection. For example, the broadband connection 140 may provide a wired connection that communicatively couples two or more devices within the location 100 utilizing a coaxial cable, for example. In another example, a portion of the broadband connection 140 may provide a wireless connection between two or more devices within the location 100.

The television 110 may comprise suitable logic, circuitry, code, and/or interfaces that may be operable to receive signals from which to display images (for example, moving images) that are typically accompanied by sound. The television 100 may be based on, for example, cathode ray tube (CRT) technology, plasma technology, liquid crystal display (LCD) technology, and/or light emitting diode (LED) backlit LCD technology. The television 110 may be operable to support one or multiple technical standards such as digital television (DTV) and high-definition television (HDTV), for example. The resolution of the screen or display portion of the television 110 may be based on the technical standard supported by the television 110. For example, for HDTV, the resolution of the screen may be 720p, 1080i, or 1080p, where the numeral indicates the vertical resolution of the screen, the letter "p" refers to progressive-scan format, and the letter "i" refers to interlaced-scan format.

The STB 120 may comprise suitable logic, circuitry, code, and/or interfaces that may be operable to connect the television 110 to an external source of signals and to convert those signals into contents that may be displayed on the screen of the television 110. The STB 120 may be operable to provide processing associated with managing, delivering, and/or storing various information resources or contents such as audio, video, bitmap, text, or graphics contents that may be presented or rendered on the television 110.

The STB 120 may also be operable to run a web browser that may be displayed on the screen of the television 110 for user interaction, for example. A web browser is typically a software application that may enable a user to retrieve, present, and/or review information resources available on, for example, the World Wide Web ("the Web"). An information resource may comprise a web page, an image, video, text, graphics, and/or other type of multimedia content, for example. A web browser may be utilized to access an available information resource that is provided by web servers in private networks and/or files in file systems. Examples of web browsers may comprise Internet Explorer, Mozilla Firefox, Apple Safari, Google Chrome, Opera, and/or browsers that may be native or custom-made for the STB 120.

Information resources are brought to a user via a web browser when the user inputs, for example, a Uniform Resource Identifier (URI), into the web browser. In this regard, the STB 120 may be configured to automatically pass one or more processing assistant requests on to the local server 130 or the server computing cloud 150 whenever the user inputs a URI into the web browser. The processing assistant requests may comprise information such as the URI input in the web browser to indicate how to retrieve information resources or contents associated with the URI. For example, a prefix of the URI that starts with "http:" may indicate that the associated information resources or contents may be retrieved over Hypertext Transfer Protocol (HTTP). Other URI prefixes that may be supported comprise, for example, "https:" for HTTP Secure (HTTPS), "ftp:" for the File Transfer Protocol (FTP), and "file:" for local files. A Uniform Resource Locator (URL) is typically a subset of the URI that specifies the location where an information resource or content is available for retrieval and/or the mechanism for retrieval.

Upon a URI entered into the web browser in the STB 120, the STB 120, instead of communicating directly with a web server, may be configured to send one or more processing assistant requests for information resources or contents associated with the URI to the local server 130 or the server computing cloud 150. The STB 120 may be operable to offload various web page related processing tasks such as, for example, content acquiring, content processing, and/or content encoding, to the local server 130 or the server computing cloud 150. For example, for the URI entered in the web browser in the STB 120, the local server 130 or the server computing cloud 150 may be operable to determine how and where to retrieve the corresponding information resources or contents associated with the URI based on the processing assistant requests received from the STB 120. The local server 130 or the server computing cloud 150 may be operable to communicate with a web server so as to retrieve the corresponding information resources or contents associated with the URI. The retrieved information resources or contents may be processed by the local server 130 or the server computing cloud 150 according to corresponding content type. The local server 130 or the server computing cloud 150 may also be operable to encode the processed information resources or contents into formats that may be utilized or acceptable by the STB 120. The STB 120 may be operable to receive the resulting encoded information resources or contents associated with the URI from the local server 130 or the server computing cloud 150. The STB 120 may be operable to decode the received encoded information resources or contents to composite the complete web page corresponding to the URI. The complete web page may be rendered by the STB 120 for display via the web browser. For example, in instances where the received encoded contents may comprise HyperText Markup Language (HTML), the HTML may be passed to a layout engine in the web browser to be transformed from markup to an interactive document. In addition to HTML, web browsers may be utilized to display different types of information resources or contents on a web page. For example, web browsers may display images, audio, video, and XML files, and often have or support certain plug-ins for Flash applications and Java applets.

The local server 130 may comprise suitable logic, circuitry, code, and/or interfaces that may be operable to run or execute certain software applications that may be accessible from the STB 120 via the broadband connection 140. In this regard, the local server 130 may be operable to provide support to the web browsing operations provided by the STB 120. Specifically, the local server 130 may be operable to handle various web page related processing tasks such as, for example, content retrieving and content processing, associated with a URI entered into the web browser in the STB 120. One or more processing assistant requests from the STB 120 for various web page processing associated with the URI may be received by the local server 130. For example, the local server 130 may be operable to determine how and where to retrieve the corresponding information resources or contents for a web page corresponding to the URI based on the received processing assistant requests.

The local server 130 may in turn communicate with a web server to retrieve the corresponding information resources or contents associated with the URI. The retrieved information resources or contents may be processed depending on, for example, corresponding content type such as video contents, audio contents, text contents, and/or bitmap or graphics contents. The content formats that are supported by the STB 120 may be determined by the local server 130. The local server 130 may be operable to encode the processed information resources or contents into corresponding determined content formats supported by the STB 120.

In instances where the web page associated with the URI may comprise a plurality of different portions, the local server 130 may be configured to encode each portion of the web page based on corresponding content type. For example, the web page associated with the URI may comprise a plug-in portion and a HTML portion. In instances where both the plug-in portion and the HTML portion are video, the local server 130 may be configured to encode the processed information resources or contents for the plug-in portion and the HTML portion as video. In instances where both the plug-in portion and the HTML portion are bitmap or graphics, the local server 130 may be configured to encode the processed information resources or contents for the plug-in portion and the HTML portion as bitmap or graphics. In instances where the plug-in portion is video while the HTML portion is bitmap and/or graphics, the local server 130 may be configured to encode the processed information resources or contents for the plug-in portion as video and encode the processed information resources or contents for the HTML portion as bitmap and/or graphics, respectively. In addition, in instances where the HTML bitmap or graphics is located within the plug-in video, the local server 130 may be configured to overlay or paste the resulting encoded HTML bitmap or graphics on the corresponding encoded plug-in video.

The server computing cloud 150 may comprise a plurality of servers such as, for example, a server 150a, and/or computing devices associated with providing various services offered by the Internet. In this regard, the term 'cloud' typically refers to the Internet and is based on the graphical depiction of the Internet as a cloud in computer network diagrams to represent the underlying infrastructure of the Internet. The servers such as the server 150a in the server computing cloud 150 may be utilized to provide reliable services that may be delivered through individual servers and/or data centers, for example. The server computing cloud 150 may appear, to a user or to a location (for example, location 100), as a single point of access to services and/or resources that may be provided by the server computing cloud 150. The servers in the server computing cloud 150 may comprise, for example, applications servers that may be dedicated to running certain software applications and/or web servers in which HTTP clients connect to send commands and receive responses along with data content.

A web server (not shown) in the server computing cloud 150, for example, may comprise suitable logic, circuitry, code, and/or interfaces that may be operable to deliver to a client (for example, the STB 120) web pages (for example, HTML documents) and associated contents (for example, images, style sheets, JavaScripts). When a client requests a specific information resource using HTTP, the web server may respond by providing the contents associated with that information resource. A full implementation of HTTP may enable the web server to receive contents from a client.

A server such as the server 150a in the server computing cloud 150, such as an applications server, for example, may be utilized, just like the local server 130, to support web browsing operations in the STB 120. In such instances, the server 150a in the server computing cloud 150 may have processing capabilities sufficient to run or execute software applications that provide such support. The server 150a may also be referred to as a render server or an STB assistance server, for example, to indicate that the server 150a may be operable to assist the STB 120 to render web content. Whether a server such as the server 150a in the server computing cloud 150 or the local server 130 is utilized to support web browsing operations in the STB 120 may depend, at least in part, on the amount of latency that may be acceptable to a user when having web browsing operations in the STB 120, such as the rendering of a web page, for example, be supported or assisted by another resource. In this regard, a local resource (for example, the local server 130) may have lower latency than a remote resource (for example, the server 150a in server computing cloud 150). Whether a server in the server computing cloud 150 or the local server 130 is utilized to support web browsing operations in the STB 120 may also depend on, for example, availability of the local server 130, available resources on the local server 130, the processing capabilities and the type of support that may be provided. The server 150a need not be physically collocated with a web server. The server 150a may be in different location from the web server.

The server computing cloud 150 may connect to the location 100 via a broadband connection 145. The broadband connection 145 may provide a wired connection between the server computing cloud 150 and the broadband connection 140 in the location 100 utilizing a coaxial cable, for example. Other embodiments, however, need not be so limited. For example, the broadband connection 145 may comprise a combination of wired and wireless portions, wherein the wired portion may utilize coaxial cables, optical fibers, and/or other large bandwidth transmission medium.

The ground station 170, the broadband connection 175, the satellite 165, and the satellite receiver 160 may be operable to enable the STB 120 to communicate with a server in the server computing cloud 150 that may be operable to provide web browsing support to the STB 120 and/or with a web server from which web page information may be retrieved, for example. The ground station 170 and/or the satellite 165 shown in the location 100 are illustrated only as an exemplary configuration. Other configurations for the location 100 may be applied without departing from the scope of the present invention. For example, a different or the same configuration for the location 100 may be implemented to deliver television programs and/or broadband Internet to, for example, a vestigial sideband broadcast (VSB) off-air STB and/or a cable STB.

Although the STB 120 with a broadband connection capability is illustrated in FIG. 1 for full Internet experience, the invention may not be so limited. Accordingly, instead of the STB 120, the television 110 itself with a broadband connection capability for full Internet experience may be supported without departing from the spirit and scope of various embodiments of the invention.

In operation, a user may decide to access a web page via a web browser in the STB 120 and being displayed in the television set 110 while comfortably sitting in his/her living room. The user may submit a URL to the web browser in the STB 120. Instead of communicating directly with a web server, the STB 120 may be configured to automatically pass a processing assistant request on to the local server 130 or the server computing cloud 150 for corresponding information resources or contents associated with the URL. The processing assistant request comprises, for example, the URL submitted by the user. The local server 130 or the server computing cloud 150 may in turn communicate with a web server to retrieve the information resources or contents associated with the URL. The retrieved information resources or contents may be processed based on, for example, corresponding content type. For example, the web page associated with the URL may comprise a plug-in video portion and a HTML bitmap or graphics portion.

The local server 130 or the server computing cloud 150 may be configured to process the retrieved information resources or contents for the plug-in video portion and the HTML bitmap or graphics portion, respectively. The processed information resources or contents for the plug-in video portion may be encoded as video. The processed information resources or contents for the HTML bitmap or graphics portion may be encoded as bitmap or graphics. In instances where the HTML bitmap or graphics portion may be located within the plug-in video portion, the local server 130 or the server computing cloud 150 may be operable to further overlay or paste the encoded HTML bitmap or graphics on the corresponding encoded plug-in video portion to transmit to the STB 120. The STB 120 may be operable to decode the corresponding encoded information resources or contents received from the local server 130 or the server computing cloud 150. The STB 120 may be operable to render the resulting decoded information resource or contents to composite the complete web page for display via the web browser.

Figure 2:
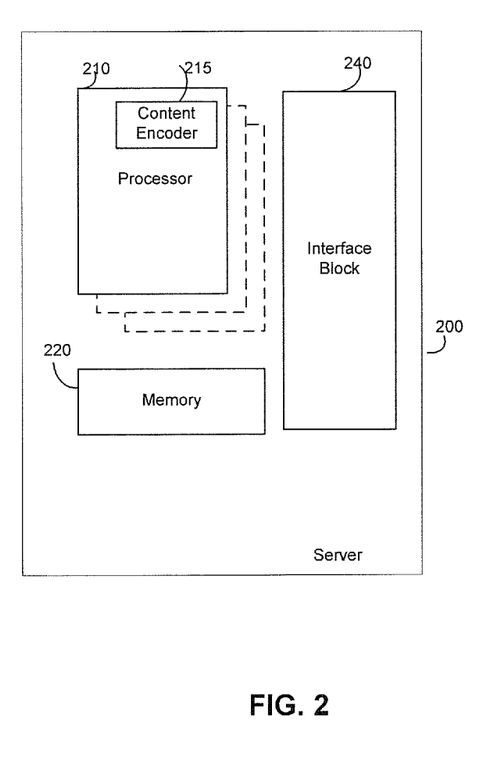
FIG. 2 is a block diagram that illustrates an exemplary server that provides full information processing assistance for web page rendering by a local web browser in an STB, in accordance with an embodiment of the invention.

FIG. 2 is a block diagram that illustrates an exemplary server that provides full information processing assistance for web page rendering by a local web browser in an STB, in accordance with an embodiment of the invention. Referring to FIG. 2, there is shown a server 200 that may comprise a processor 210, a content encoder 215, a memory 220, and an interface block 240. The content encoder 215 may be optional.

The server 200 may correspond to the local server 130 and/or a server in the server computing cloud 150, for example, the server 150a, and may be operable to provide web browsing support to the STB 120 described above, for example.

The processor 210 may comprise suitable logic, circuitry, code, and/or interfaces that may be operable manage and/or control operations of associated device component units such as the interface block 240. The processor 210 may comprise an x86-based architecture that may support processing of, for example, certain plug-ins developed or coded for execution in an x86-based processor architecture. The server 200 may be operable to provide an emulator of the x86-based processor to process contents unsupported and supported by the STB 120. The processor 210 may be operable to communicate with the STB 120 to handle all aspects of information resource or content processing for a web page to be rendered by the STB 120. In this regard, the processor 210 may be operable to receive one or more processing assistant requests from the STB 120 for web page processing. The processor 210 may be operable to identify how and where to retrieve corresponding information resources or contents associated with the web page based on, for example, a URI, in the received processing assistant request. The processor 210 may in turn communicate with a web server to retrieve the information resources or contents associated with the URI.

The processor 210 may be operable to process the retrieved information resources or contents according to corresponding content type. For example, the web page associated with the URI may comprise a plug-in video portion and a HTML bitmap or graphics portion, the processor 210 may be operable to perform video processing on the retrieved information resources or contents for the plug-in video portion and perform bitmap or graphics processing on the retrieved information resources or contents for the HTML bitmap or graphics portion, respectively. The processor 210 may be operable to determine content formats that the STB 120 may support. The resulting processed information resources or contents for the plug-in video portion and for the HTML bitmap or graphics portion may be encoded via the content encoder 215 as video, and bitmap or graphics, respectively, based on the determined content formats. The content encoder 215 may comprise suitable logic, circuitry, interfaces and/or code that may be operable to transform data processed by the processor 210 into format supported by the STB 120.

The processor 210 may be operable to transmit the resulting encoded information resources or contents to the STB 120. In instances where the HTML bitmap or graphics portion may be located within the plug-in video portion, the processor 210 may be operable to overlay or paste the encoded HTML bitmap or graphics on the corresponding encoded plug-in video to transmit to the STB 120. The processor 210 may be operable to utilize a plurality of different encoders to encode different types of contents retrieved for the web page associated with the URI into different formats that may be utilized by the STB 120 for content receiving.

The memory 220 may comprise suitable logic, circuitry, interfaces and/or code that may be operable to store information such as executable instructions and data that may be utilized by the processor 210 and/or other associated component units such as, for example, the interface block 240. The memory 220 may be operable to store information (for example, coefficients, tables) associated with the encoding operations supported by the processor 210. The memory 220 may comprise RAM, ROM, low latency nonvolatile memory such as flash memory and/or other suitable electronic data storage.

The interface block 240 may comprise suitable logic, circuitry, code, and/or interfaces that may be operable to enable the server 200 to communicate with the STB 120 and/or with a web server from which to obtain web page information, for example. The interface block 240 may support a plurality of physical and/or logical connections or interfaces. When the server 200 corresponds to the local server 130 described above, the interface block 240 may support communication with the STB 120 via the broadband connection 140 (for example, coaxial cable).

In an exemplary operation, the server 200 may receive requests such as a processing assistant request from the STB 120 to handle web page related processing associated with a URL, for example, that is entered in the web browser in the STB 120. The processor 210 may be operable to communicate with a web server via the interface block 240 so as to retrieve corresponding information resources or contents associated with the URL. The retrieved information resources or contents may be processed by the processor 210 based on, for example, content type such as video content, audio content, and/or bitmap or graphics content. The processed contents may be encoded via the content encoder 215 into corresponding formats that may be utilized by the STB 120 for content receiving. The processor 210 may be operable to communicate the encoded information resources or contents with the STB 120 via the interface block 240 for rendering the complete web page by the STB 120.

Figure 3:
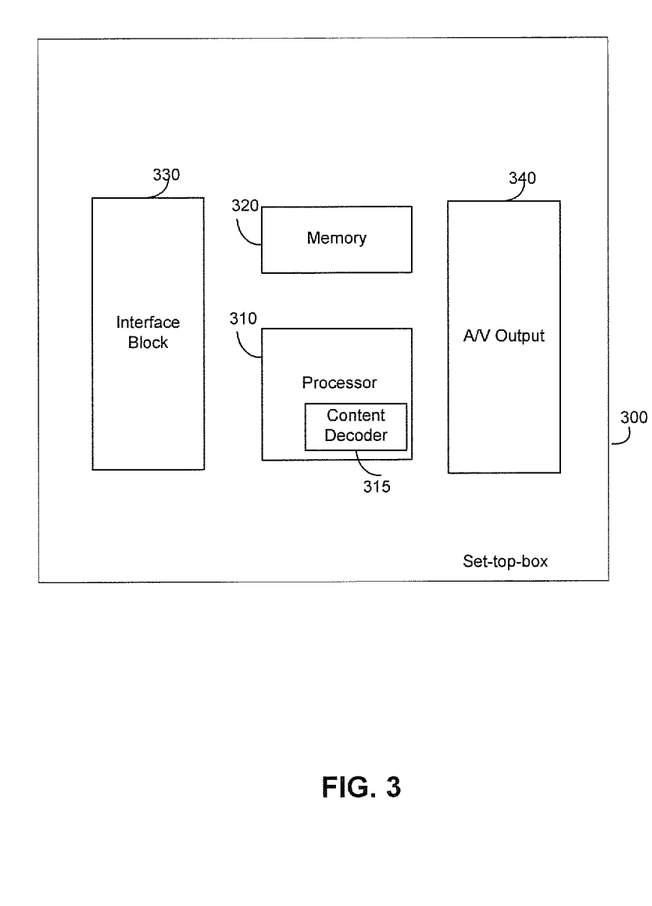
FIG. 3 is a block diagram that illustrates an exemplary STB that enables a user of the STB to access Internet services through full server assisted processing, in accordance with an embodiment of the invention.

FIG. 3 is a block diagram that illustrates an exemplary STB that enables a user of the STB to access Internet services through full server assistant processing, in accordance with an embodiment of the invention. Referring to FIG. 3, there is shown an STB 300 that may comprise a processor 310, a content decoder 315, a memory 320, an interface block 330, and an A/V output 340. The content decoder 315 may be optional. In some embodiments, two or more of the components of the STB 300 may be integrated into a single chip.

The processor 310 may comprise suitable logic, circuitry, interfaces and/or code that may be operable to manage and/or control operations of device components such as the interface block 330 and the A/V output 340. The processor 310 may be operable to provide processing assistance associated with managing, delivering, and/or storing contents that may be displayed on, for example, the television 110 described above. The processor 310 may also be operable to run or execute a web browser that may be displayed on the screen of the television 110 for user interaction.

The processor 310 may be operable to perform a pre-fetch operation of web page information provided by a web server to determine the type of contents that are within the web page. The processor 310 may be operable to perform the pre-fetch operation as a background process, for example.

The processor 310 may be operable to automatically send one or more processing assistant requests, regardless of its own processing capability, to the local server 130 or the server computing cloud 150 whenever a user inputs, for example, a URI, into the web browser in the STB 300. The processing assistant requests may comprise the URI input in the web browser to provide information on how and where to retrieve corresponding information resources or contents associated with the URI. The web page processing tasks or operations such as, for example, content retrieving, content processing and/or content encoding, associated with the URI may be transferred by the processor 310 to the local server 130 or the server computing cloud 150. The processor 310 may be operable to receive resulting processed and/or encoded information resources or contents associated with the URI from the local server 130 or the server computing cloud 150. The received information resources or contents may be decoded via the content decoder 315. The content decoder 315 may comprise suitable logic, circuitry, interfaces and/or code that may be operable to transform data encoded by the local server 130 or the server computing cloud 150 into a desired format for display. The decoded information resources or contents may be rendered by the processor 310 to composite the complete web page for display to the user via the web browser. The processor 310 may be operable to present different types of information resources or contents, for example, images, audio, video, XML files, and/or plug-ins, such as plug-in for Flash Application and/or Java applet, on the associated web page via the web browser.

The memory 320 may comprise suitable logic, circuitry, interfaces and/or code that may be operable to store information such as executable instructions and data that may be utilized by the processor 310 and/or other associated component units such as, for example, the interface block 330 and the A/V output 340. The memory 320 may comprise RAM, ROM, low latency nonvolatile memory such as flash memory and/or other suitable electronic data storage.

The interface block 330 may comprise suitable logic, circuitry, code, and/or interfaces that may enable the STB 300 to interface with a plurality of devices, including render servers and/or web servers. For example, the interface block 330 may support connections with cable TV services and/or satellite services. The interface block 330 may support multiple ports such as High-Definition Multimedia Interface (HDMI), Ethernet Physical Layer (PHY), Universal Serial Bus (USB), and RS232, for example. Other types of connections, protocols, and/or ports may also be supported.

The A/V output 340 may comprise suitable logic, circuitry, code, and/or interfaces that may be operable to provide audio and/or video contents for display or reproduction to, for example, the television 110 described above. In this regard, the A/V output 340 may support multiple technical standards such as DTV and HDTV, and/or multiple screen resolutions.

Although a STB with a broadband connection capability is illustrated in FIG. 3 for full Internet experience, the invention may not be so limited. Accordingly, other devices such as a television itself with a broadband connection capability for full Internet experience may be supported without departing from the spirit and scope of various embodiments of the invention.

In an exemplary operation, a web browser may be run in the STB 300 and may be displayed in a television, for example, the television 110, via the A/V output 340. When a user interacts with the web browser, for example, via a set-top-box remote control or keyboard, and submits a URL to the web browser, the processor 310 may be configured to automatically send a request for web page processing associated with the URL to the local server 130 or the server computing cloud 150 via the interface block 330. The local server 130 or the server computing cloud 150 may in turn retrieve corresponding information resources or contents associated with the URL from a web server. The retrieved information resources or contents may be processed and/or encoded by the local server 130 or the server computing cloud 150. The STB 300 may be operable to receive the resulting processed and/or encoded information resources or contents, via the interface block 330, from the local server 130 or the server computing cloud 150. The processor 310 may be operable to decode the received information resources or contents. The processor 310 may be operable to render the decoded information resources or contents associated with the URI to composite the complete web page for display to the user via the web browser.

Figure 4:
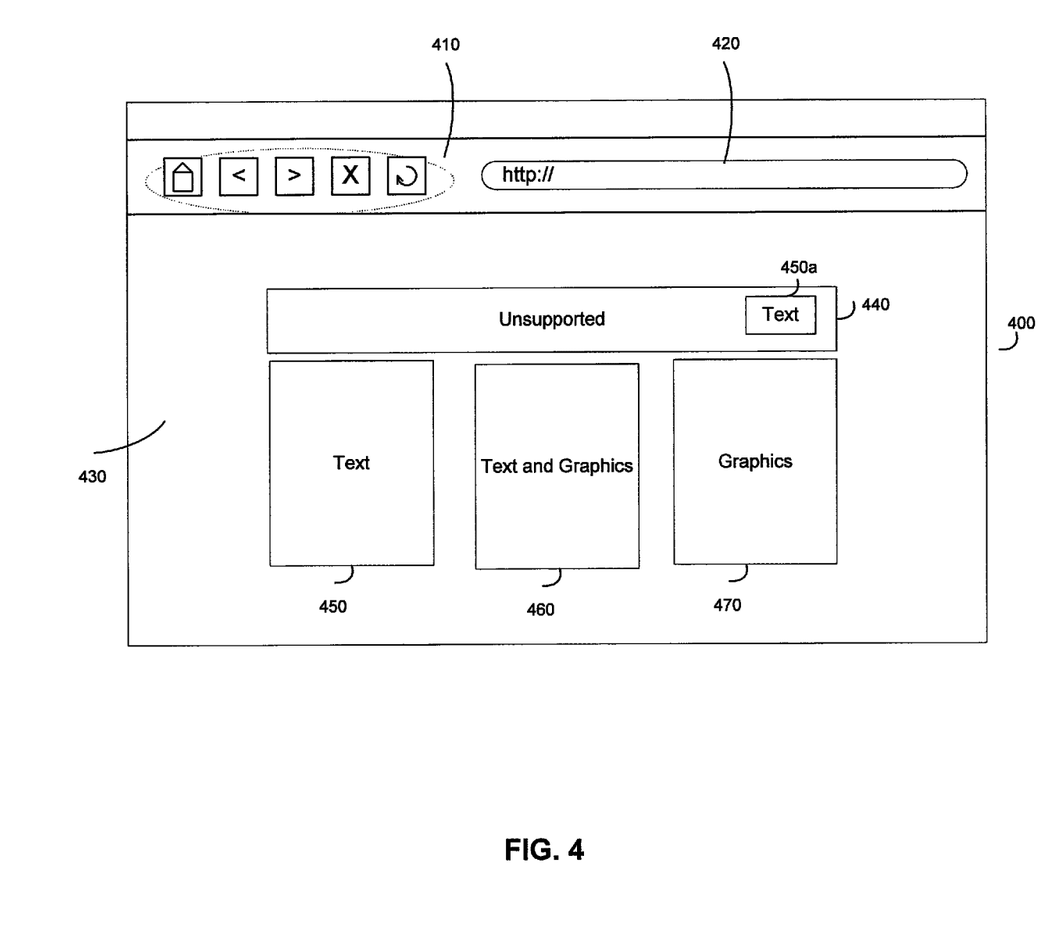
FIG. 4 is a diagram that illustrates an exemplary web page with multiple content types that is to be displayed by a local web browser in an STB, in accordance with an embodiment of the invention.

FIG. 4 is a diagram that illustrates an exemplary web page with multiple content types that is to be displayed by a local web browser in an STB, in accordance with an embodiment of the invention. Referring to FIG. 4, there is shown a web browser 400 in a STB such as the STB 300. The web browser 400 comprises a web page 430, which is to be displayed or rendered. The web browser 400 may comprise certain user interface elements 410 (for example, back, forward, reload, stop, home) that may be utilized for navigation and/or operation, and an address bar 420 that may be utilized to submit a URI.

The web page 430 to be displayed in the web browser 400 may comprise different types of contents. In the example illustrated in FIG. 4, the web page 430 may comprise a text portion 450, a text and graphics portion 460, a graphics portion 470, and an unsupported (for example, plug-ins) portion 440. The web page 430 also comprises a text portion 450a located within the unsupported portion 440. Instead of communicating directly with a web server for information resources or contents associated with the URI entered in the address bar 420, the STB 300 may be operable to automatically send one or more processing assistant requests, regardless its own processing capability, to the local server 130 or the server computing cloud 150 for corresponding information resources and/or contents associated with each portion, for example, the text portions 450-450a, the text and graphics portion 460, the graphics portion 470, and the unsupported portion 440, of the web page 430. The local server 130 or the server computing cloud 150 may be operable to retrieve the information resources and/or contents for each portion of the web page 430 from a web server.

The retrieved information resources and/or contents associated with each portion of the web page 430 may be processed by the local server 130 or the server computing cloud 150. The resulting processed information resources and/or contents may be encoded based on corresponding content type. For example, the processed information resources and/or contents for the text portions 450-450a and the graphics portion 470 may be encoded as bitmap and graphics, respectively. The processed information resources and/or contents for the text and graphics portion 460 may be encoded as bitmap and graphics. In instances where the unsupported portion 440 may be identified as video, the local server 130 or the server computing cloud 150 may be operable to encode the corresponding processed information resources or contents associated with the unsupported portion 440 as video. In addition, the encoded bitmap contents for the text portion 450a may be overlaid or pasted on the corresponding encoded video of the unsupported portion 440. The local server 130 or the server computing cloud 150 may be operable to provide the encoded information resource or contents for each portion of the web page 430 back to the STB 300 in formats that the STB 300 may utilize to composite the web page 430 in the web browser 400.

Figure 5:
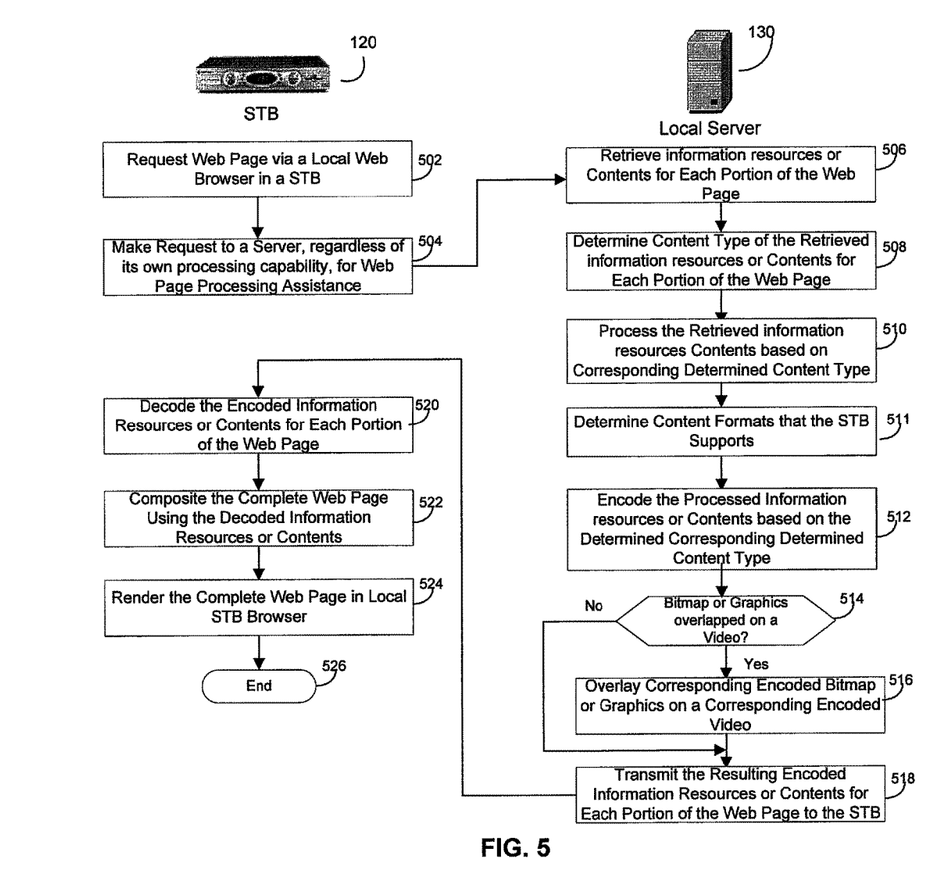
FIG. 5 is a flow diagram that illustrates exemplary steps for performing web page rendering by a local web browser in an STB through full server assisted processing, in accordance with an embodiment of the invention.

FIG. 5 is a flow diagram that illustrates exemplary steps for performing web page rendering by a local web browser in an STB through full server assisted processing, in accordance with an embodiment of the invention. Referring to FIG. 5, the exemplary steps may start with step 502. In step 502, a user may enter a URI, for example, into a local web browser in a STB such as the STB 120 to request a web page. In step 504, the STB 120 may be operable to automatically make a request, regardless of its own processing capability, to the local server 130, for example, for web page processing associated with the URI. In step 506, the local server 130 may be operable to retrieve information resources or contents associated with each portion of the web page from a web server based on the request received from the STB 120. In step 508, the local server 130 may be operable to determine content type, for example, video contents, audio contents, bitmap or graphics contents, of the retrieved information resource or contents for each portion of the web page. In step 510, the local server 130 may be operable to process the retrieved information resource or contents for each portion of the web page based on corresponding determined content type. In step 511, the local server 130 may be operable to determine content formats that the STB 120 may support.

In step 512, the local server 130 may be operable to encode the processed information resource or contents for each portion of the web page based on corresponding determined content formats. In step 514, it may be determined whether there is a bitmap or graphics overlapped on a video within the web page. In instances where there is a bitmap or graphics overlapped on a video within the web page, then control passes to step 516. In step 516, the local server 130 may be operable to overlay encoded bitmap or graphics on the corresponding encoded video. In step 518, the local server 130 may be operable to transmit the resulting encoded information resources or contents for each portion of the web page to the STB 120. In step 520, the STB 120 may be operable to receive the encoded information resources or contents from the local server 130. The STB 120 may be operable to decode the received information resources or contents for each portion of the web page. In step 522, the STB 120 may be operable to composite the complete web page using the decoded contents for each portion of the web page. In step 524, the STB 120 may be operable to render the complete web page in local web browser in the STB 120. The exemplary steps may end in step 526.

In step 514, in instances where there is no bitmap or graphics overlapped on a video within the web page, then the exemplary steps may proceed in step 518.

In various exemplary aspects of the method and system for providing complete Internet anywhere with full server assisted processing, a STB such as the STB 120 is communicatively coupled to a server such as the local server 130 or a server in the server computing cloud 150, for example, the server 150a. The STB 120 may be operable to receive a web page request when a user inputs, for example, a URI, into the address bar 420 in the web browser 400 running in the STB 120. In response, the STB 120 may be operable to send a web page processing assistance request to the local server 130 or the server 150a in the server computing cloud 150 to process the entire web page 430 regardless of processing capability of the STB 120. The web page processing assistance request may comprise the URI entered in the address bar 420 in the web browser 400. The STB 120 may be operable to receive processed information resources or contents associated with each portion of the entire web page 430 from the local server 130 or the server 150a in the server computing cloud 150. The local server 130 or the server 150a in the server computing cloud 150 may be operable to communicate with a web server so as to retrieve corresponding information resources or contents associated with each portion of the entire web page 430 based on the received web page processing assistance request from the STB 120.

In various embodiments of the invention, the local server 130 or the server 150a in the server computing cloud 150 may be operable to determine content type such as, for example, video, audio, bitmap and/or graphics, of the corresponding retrieved information resources or contents associated with each portion of the entire web page 430. The retrieved information resource or contents for each portion of the entire web page 430 may be processed my the local server 130 or the server 150a in the server computing cloud 150 based on the corresponding determined content type. Content formats supported by the STB 120 may be determined for each portion of the entire web page 430.

The local server 130 or the server 150a in the server computing cloud 150 may be operable to encode the corresponding processed information resources or contents associated with each portion of the entire web page based on the determined content formats. The encoded information resources or contents may be communicated by the local server 130 or the server 150a in the server computing cloud 150 to the STB 120 via the interface block 240. The STB 120 may be operable to decode the encoded information resources or contents associated with each portion of the entire web page from the local server 130 or the server 150a in the server computing cloud 150. The decoded information resources or contents may be utilized by the STB 120 to composite the entire web page to be rendered for display via the web browser 400 in the STB 120.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for providing complete Internet anywhere with full server processing.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
receiving, using circuitry of a device communicatively coupled to a plurality of servers, a web page request via a web browser running on the device;
selecting, by the device in response to said received web page request, an assistance server from the plurality of servers to which to send a web page processing assistance request from the device, according to a capability of the assistance server and a latency of the server that is lower than that of others of the plurality of servers to retrieve a web page from a web server separate from the selected assistance server and to process the web page retrieved from the web server for rendering by the device, the web page processing assistance request for requesting the selected assistance server to retrieve the web page from the web server separate from the selected assistance server and to process the web page retrieved from the web server for rendering by the device;
sending, by the device, the web page processing assistance request to the selected assistance server;
receiving, by the device, the web page processed by the selected assistance server, including receiving a first portion of the web page, that was encoded according to a first content format, that is encoded according to a second content format supported by the device; and
decoding, by the device, the first portion of the web page that is encoded according to the second content format supported by the device.

2. The method of claim 1, further comprising determining that the server is available to process the web page for rendering by the device, and that the latency is within a threshold for web browsing operations in the device.

3. The method of claim 1, comprising rendering, by the device, the web page processed by the selected assistance server.

4. The method of claim 1, wherein the selected assistance server comprises a local server or a remote server.

5. A method for communication, the method comprising:
receiving, using circuitry of a device communicatively coupled to a plurality of servers, a web page request via a web browser running on the device;
selecting, by the device in response to said received web page request, an assistance server from the plurality of servers to which to send a web page processing assistance request from the device, according to a capability of the assistance server and a latency of the server that is lower than that of others of the plurality of servers to retrieve a web page from a web server separate from the selected assistance server and to process the web page retrieved from the web server for rendering by the device, the web page processing assistance request for requesting the selected assistance server to retrieve the web page from the web server separate from the selected assistance server and to process the web page retrieved from the web server for rendering by the device;

sending, by the device, the web page processing assistance request to the selected assistance server to request the selected assistance server to retrieve each portion of the web page from the web server, including information resources or contents associated with said each portion of the web page, each of the information resources or contents associated with a corresponding content type; and receiving, by the device, the web page processed by the selected assistance server.

6. The method of claim 5, wherein receiving the web page comprises receiving the information resources or contents associated with said each portion of the web page processed according to the corresponding content type.

7. The method of claim 5, further comprising compositing the processed information resources or contents associated with each portion of said web page for display via the web browser.

8. A system for communication, the system comprising:
circuitry for use in a device to execute a web browser and to communicatively couple to a plurality of servers, the circuitry further configured to:
receive a web page request via a web browser running on the device;
select, in response to said received web page request, an assistance server from the plurality of servers to which to send a web page processing assistance request from the device, according to a capability of the server and a latency of the assistance server that is lower than that of others of the plurality of servers to retrieve a web page from a web server separate from the selected assistance server and to process the web page retrieved from the web server for rendering by the device, the web page processing assistance request from the device for requesting the selected assistance server to retrieve the web page from the web server separate from the selected assistance server and to process the web page retrieved from the web server for rendering by the device;
send the web page processing assistance request to the selected assistance server;
receive the web page processed by the selected assistance server, including a first portion of the web page, that was encoded according to a first content format, that is encoded according to a second content format supported by the device; and
decode the first portion of the web page that is encoded according to the second content format supported by the device.

9. The system of claim 8, wherein the circuitry is configured to send the web page processing assistance request to request the selected assistance server to retrieve each portion of the web page, wherein information resources or contents associated with said each portion of the web page is retrieved from a web server according to the received web page processing assistance request from the device.

10. The system of claim 9, wherein each of the retrieved information resources or contents is associated with a corresponding content type.

11. The system of claim 10, wherein the circuitry is configured to receive the web page comprising receiving the information resources or contents associated with said each portion of the web page processed according to the corresponding content type.

12. The system of claim 9, wherein the circuitry is configured to composite the processed information resources or contents associated with each portion of said web page for display via the web browser.

13. The system of claim 8, wherein the circuitry is configured to determine that the server is available to process the web page for rendering by the device, and that the latency is within a threshold for web browsing operations in the device.

14. The system of claim 8, wherein the circuitry is configured to render the web page processed by the selected assistance server.

15. The system of claim 8, wherein the selected assistance server comprises a local server or a remote server.

* * * * *